April 22, 1958  A. E. HALLEK ET AL  2,831,718
CONVERTIBLE TOP HEADER LOCK ASSEMBLY
Filed Jan. 11, 1955  2 Sheets-Sheet 1
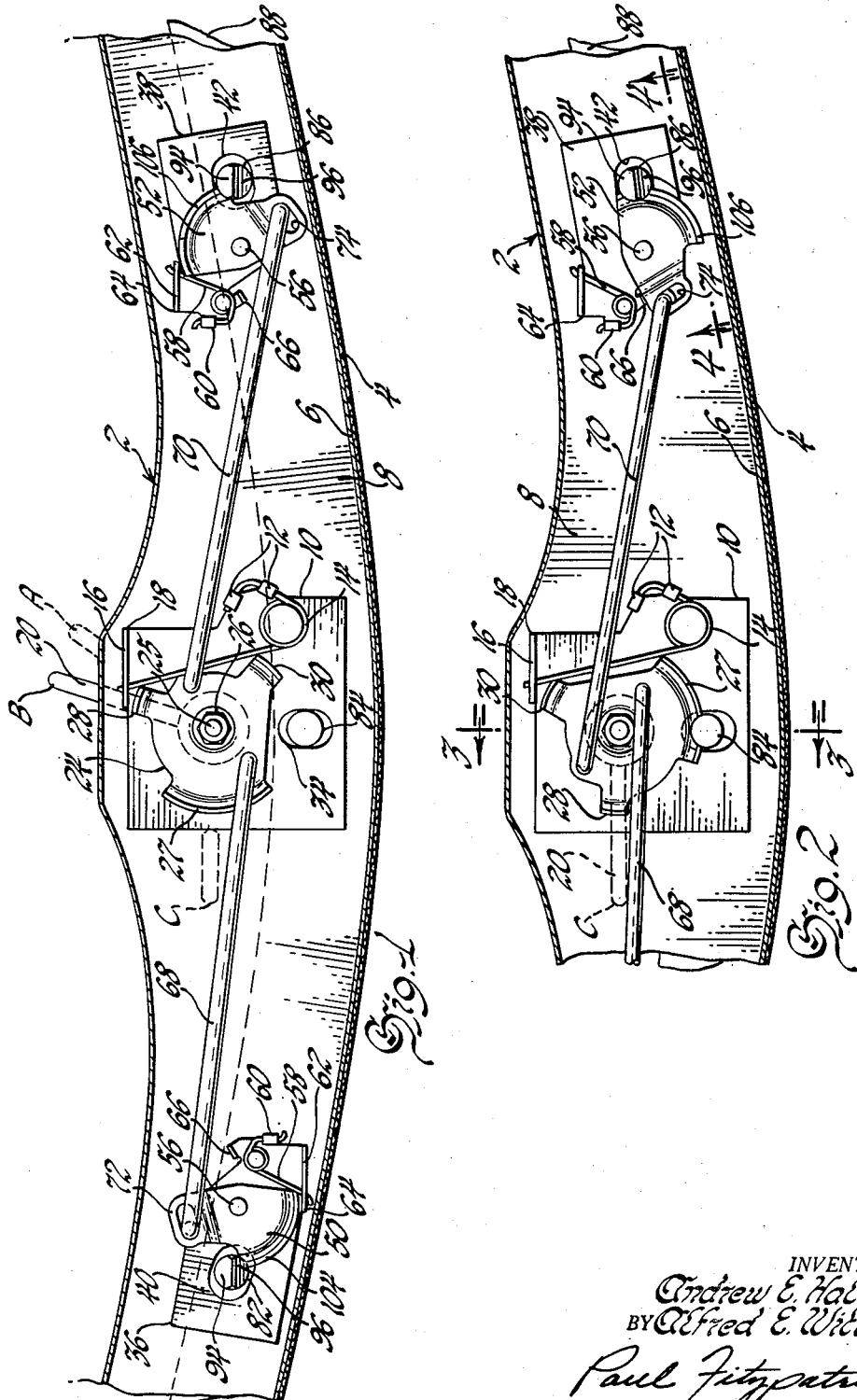
INVENTORS
Andrew E. Hallek &
BY Alfred E. Wittke
Paul Fitzpatrick
ATTORNEY

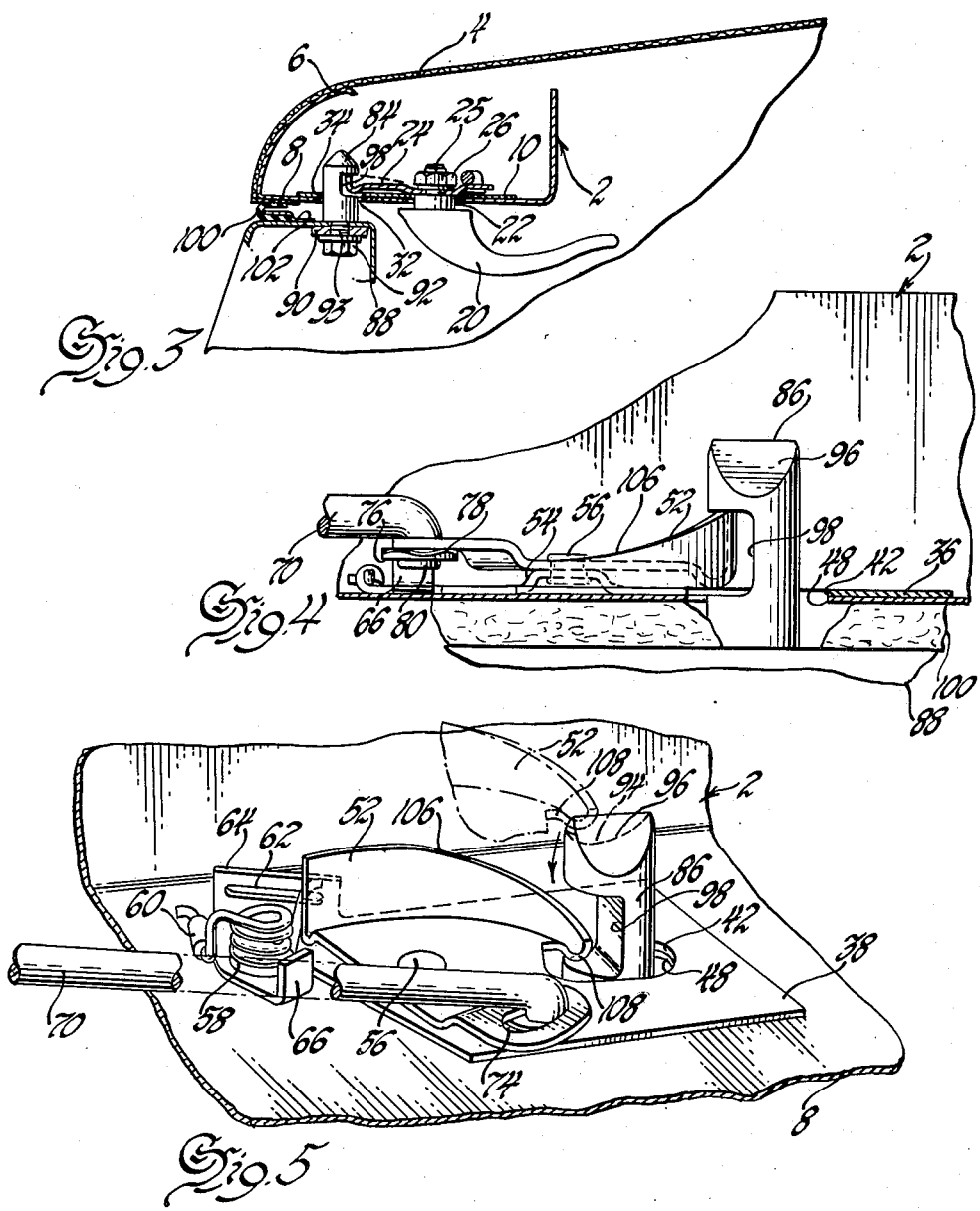

United States Patent Office 2,831,718
Patented Apr. 22, 1958

2,831,718

CONVERTIBLE TOP HEADER LOCK ASSEMBLY

Andrew E. Hallek and Alfred E. Wittke, Detroit, Mich., assignors to General Motors Corporation, a corporation of Delaware Application January 11, 1955, Serial No. 481,158

6 Claims. (Cl. 292—48)

This invention relates to a locking mechanism for an automobile convertible top header and more particularly to such a locking mechanism which automatically brings the convertible top header into partial engagement with the windshield header when the top is raised so that the top header can thereafter be easily locked in place.

The locking mechanism of this invention is manually operable to release the convertible top header from locking engagement with the windshield header when the top is to be lowered. After the top header is released from the windshield header, manual operation ceases and the locking mechanism becomes automatically operable to bring the convertible top header into partial engagement with the windshield header when the top is thereafter raised so that the top header can easily be locked in place.

In the preferred embodiment of this invention three spaced cams rotatably mounted in the convertible top header have latched, unlatched, and safety positions. A manually operable handle is provided for the center cam and links are pivotally connected off center to the center cam and slidably and pivotally connected to the terminal cams. The manually operable handle and the links rotate the center cam and the terminal cams between latched, unlatched, and safety positions. Springs provided for each of the cams resist movement of the cams to unlatched position and urge the cams to safety position. The center cam spring resists movement of the cam to latched position but tends to hold the cam in this position after it has been rotated to this position. The springs for the terminal cams have no effect on these cams in their latched position. Separate keepers mounted on the windshield header have locking surfaces engaged by the cams in their latched position, and the keepers for the terminal cams have abutment cam surfaces contactable by these cams in their safety position. To release the top header from engagement with the windshield header and lower the top, the manually operable handle and links rotate the cams to unlatched position against the action of the springs to release the cams from engagement with the keeper locking surfaces and release the top header from the windshield header. After this release has been effected, manual operation ceases and the springs return the cams to their safety position. When the top is thereafter raised, the terminal cams contact the abutment cam surfaces of the keepers to rotate these cams to unlatched position. The springs return the terminal cams to safety position wherein these cams partially engage the locking surfaces of the keepers. The manually operable handle is then rotated to bring the terminal cams and the center cam into full engagement with the locking surfaces of the keepers and lock the top header to the windshield header.

An object of this invention is to provide an automobile convertible top header with a locking mechanism which materially reduces the effort required of the operator of the automobile in raising and lowering the top. Another object of this invention is to provide an automobile convertible top header with a locking mechanism which is manually operable to release the convertible top header from locking engagement with the windshield header to lower the top and automatically operable to place the locking mechanism in safety position after release of the top has been effected and manual operation has ceased. A further object of this invention is to provide an automobile top header with a locking mechanism which is manually operable to release the top header from locking engagement with the windshield to lower the top and automatically operable to place the locking mechanism in a safety position after release of the top has been effected and manual operation has ceased so that when the top is thereafter raised the locking mechanism will automatically bring the convertible top header into partial engagement with the windshield header so that the top header can be easily locked in place.

These and other objects of this invention will be readily apparent from the following specification and drawings, in which:

Figure 1 is a top plan view of the locking mechanism in safety position with the terminal cams in partial engagement with the keepers mounted on the windshield header;

Figure 2 is a partial top plan view of the locking mechanism in latched position;

Figure 3 is a view taken on the plane indicated by line 3—3 of Figure 2 showing the center cam in latched position;

Figure 4 is a view taken on the plane indicated by line 4—4 of Figure 2 showing a terminal cam in latched position; and Figure 5 is a perspective view of the right-hand cam of Figure 1 in partial engagement with the keeper.

Referring now to Figures 1 and 3, the convertible top header 2 is an open channel, and the top fabric 4 covering the channel is secured to the front surface 6 and the forward part of the bottom surface 8 of the header. A mounting plate 10 secured to the bottom surface 8 of the channel has clinched-over tab portions 12 securing one arm of a hairpin coil spring 14 to the plate, the other arm of the spring being guided in a slot 16 in a flange portion 18 of the plate. A handle 20 has shaft 22 extending through aligned openings in the bottom surface of the header and in the plate, and a center cam 24 is non-rotatably secured on a threaded shank portion 25 of the shaft by nut 26. Cam 24 has cam surface 27 and spaced projections 28 and 30. An elongated opening 32 in the bottom surface of the top header is in alignment with a similar shaped opening 34 in plate 10.

Handle 20 has three positions, fully open position A, safety position B, and locked position C. Spring 14 bears against the sides of both projections 28 and 30 in the safety position of cam 24 as shown in Figure 1. If handle 20 is moved from its safety position B to its fully open position A, Figure 1, cam 24 is rotated clockwise so that spring 14 bears against only the side of projection 28. This is an unbalanced position of the spring, and the spring tends to return the cam to its safety position wherein the spring bears against the sides of both projections. If handle 20 is moved from its safety position B to its locked position C, Figure 2, cam 24 is rotated counterclockwise so that spring 14 now bears against the opposite side of projection 30 from that shown in Figure 1 and tends to hold the cam in its latched position. Spring 14 initially resists the rotation of the cam, but once the spring passes over the outer surface of the projection and bears against the opposite side, it tends to hold the cam in latched position, as shown in Figure 2.

Referring now to Figures 1, 4, and 5, mounting plates 36 and 38, spaced from mounting plate 10, are secured to the bottom surface of the header. These plates have elongated openings 40 and 42 in alignment with similar openings 48 in the bottom surface of the header. A pair of cams 50 and 52 are rotatably mounted on embossed portions 54 of plates 36 and 38 by rivets 56. A pair of hairpin coil springs 58 each have one arm secured to plates 36 and 38 by clinched-over tab portions 60 and the other arm slidably mounted in slots 62 in flanges 64 of the mounting plates. Each plate also has a laterally extending tab 66 acting as a stop for cams 50 and 52 in their latched position, Figures 2 and 5.

Actuating rods 68 and 70 have one end pivotally mounted off center on cam 24 and the other end slidably mounted in slots 72 and 74 of cams 50 and 52, respectively. The ends of the rods are bent at right angles to extend through the slots, Figure 4, and disk washers 76 and spring washers 78 are mounted on this portion of the rod by peening over the ends 80 of the rod. The spring disk washers prevent removal of the ends of the rods from slots 72 and 74.

Springs 58 resist movement of cams 50 and 52 to their unlatched position and tend to maintain the cams in their safety position, Figure 1, wherein rods 68 and 70 are at one end of slots 72 and 74, respectively. In the safety position of the cams, the force of the springs is sufficient only to have the ends of the slots bear against the ends of the rods, but insufficient to move the cams and rods clockwise toward the latched position of the cams as shown in Figure 2.

Referring now to Figures 1, 3, 4, and 5, a series of keepers 82, 84, and 86 are secured to the upper surface of the windshield header 88 by washers 90 and nuts 92 threaded on a reduced shank 93 of the keeper. The keepers are mounted in alignment with the openings provided in the bottom surface of the header and in the mounting plates 10, 36, and 38 so that the keepers project through these openings in the raised position of the top, as shown in Figures 3, 4, and 5. The tops of keepers 82 and 86 have oblique cam surfaces 94 and 96, and a locking slot 98 is formed in each keeper, with the slots of keepers 82 and 86 facing each other and cams 50 and 52, and the slot of keeper 82 facing cam 24. A weather strip 100, Figure 3, secured to the upper surface of windshield header 88 by tabs 102 seals the opening between the top header and the windshield header in the raised position of the top.

The operation of this locking mechanism is as follows: The locking mechanism is shown in its latched position in Figure 2 wherein cam surfaces 104 and 106 of cams 50 and 52 engage the upper surface of slots 98 of keepers 82 and 86, and cam surface 26 of cam 24 engages the same surface of keeper 84. Springs 58 have no effect on cams 50 and 52 and spring 14 bears against projection 30, as hereinbefore described, and tends to hold cam 24 in its latched position. Rods 68 and 70 have their terminal ends at the opposite ends of slots 72 and 74 from that shown in Figure 1. To release the top header from engagement with the windshield header, handle 20 is rotated from its locked position C, shown in Figures 1 and 2, to its fully open position A, shown in Figure 1. This will rotate cam 24 in a clockwise direction and release cam surface 26 from engagement with keeper 84. Cams 50 and 52 will be rotated in a counterclockwise direction to release cam surfaces 104 and 106 from keepers 82 and 86, respectively. Spring 14 will bear solely against projection 28, as hereinbefore described, and tend to urge cam 24 in a counterclockwise direction to its safety position, Figure 1. Springs 58 will bear against the ends of cams 50 and 52 tending to rotate these cams clockwise to their safety position, Figure 1. Handle A is released after the top header has been raised above the windshield header so that keepers 82, 84, and 86 no longer project through the openings in the top header and mounting plates. Spring 14 will then return cam 24 to its safety position, Figure 1, and springs 58 will return cams 50 and 52 to the same position as shown in this figure wherein an end surface 108 of each cam partially covers the aligned openings in the mounting plates and top header.

This position is the safety position of the locking mechanism and cams 50 and 52 are now in a position to automatically effect a partial engagement between the top header and the windshield header when the top is thereafter raised. When the top is raised, surfaces 108 of cams 50 and 52 contact cam surfaces 94 of keepers 82 and 86 as the top header approaches the windshield header. This rotates the cams in a counterclockwise direction against the action of springs 58 and allows the keepers to enter the aligned openings formed in the mounting plates and the top header. After the top header has been brought substantially to its position shown in Figure 3, springs 58 return cams 50 and 52 to their safety position wherein the cams are partially within slots 98 of the keepers as shown in Figure 5. The pivotal and sliding connections between the ends of rods 68 and 70 and the cams permit the cams to be moved to their fully open position and returned to their safety position to engage slots 98 without movement of the rods and center cam 24. After the cams are partially within slots 98, handle 20 is rotated from its gravity position B to its locked position C to bring cam surface 26 into engagement with keeper 84 and to bring cam surfaces 104 and 106 into full engagement with keepers 82 and 86.

The partial engagement of the top header with the windshield header is shown in Figure 5. Cam 52 is shown in dotted lines with surface 108 contacting cam surface 94 of keeper 86 to rotate the cam counterclockwise against the action of spring 58 and allow keeper 86 to enter the aligned openings in the top header and plate 38. After the keeper projects through the aligned openings, spring 58 returns cam 52 to its safety position wherein it partially engages slot 98 as shown in full lines. The top cannot be lowered with the cam in this position, for cam surface 106 of cam 52 will abut against the upper surface of slot 98 and prevent release of the top header from partial engagement with the windshield header.

The linkage mechanism for raising and lowering the convertible top is not shown in the drawings, but many such mechanisms are well known in the art. The top may be raised and lowered either manually, electrically, or hydraulically, inasmuch as the locking mechanism will work with any mode of operation of the top.

While a specific embodiment of this invention has been shown and described, various changes and modifications may be made within the scope and spirit of the invention.

We claim:

1. Locking mechanism for an automobile convertible top header comprising spaced cam means rotatably mounted in said header and having latched, unlatched, and safety positions, resilient means resisting movement of said cam means to unlatched position and urging said cam means to safety position, keeper means contactable by said cam means for moving said cam means from said safety position to said unlatched position, said resilient means returning said cam means to safety position wherein said cam means partially engage said keeper means, manually operable means for moving said cam means from said safety position to said latched position, and lost motion connecting means between said manually operable means and said cam means whereby said keeper means moves said cam means from said safety position to said unlatched position and said resilient means returns said cam means to said safety position without movement of said manually operable means.

2. Locking mechanism for an automobile convertible top header comprising spaced cam means rotatably mounted in said header and having latched, unlatched, and safety positions, resilient means resisting movement of said cam means to unlatched position and urging said cam means to safety position, means engageable by said resilient means in the safety position of said cam means whereby said resilient means is ineffective on said cam means in said latched position thereof, keeper means contactable by said cam means for moving said cam means from said safety position to said unlatched position, said resilient means returning said cam means to safety position wherein said cam means partially engage said keeper means, manually operable means for moving said cam means from said safety position to said latched position, and lost motion connecting means between said manually operable means and said cam means whereby said keeper means moves said cam means from said safety position to said unlatched position and said resilient means returns said cam means to said safety position without movement of said manually operable means.

3. Locking mechanism for an automobile convertible top header comprising spaced cam means rotatably mounted in said header and having latched, unlatched, and safety positions, resilient means resisting movement of said cam means to unlatched position and urging said cam means to safety position, keeper means contactable by said cam means for moving said cam means from said safety position to said unlatched position, said resilient means returning said cam means to safety position wherein said cam means partially engage said keeper means, and manually operable means slidably and pivotally connected to said cam means for moving said cam means from said safety position to said latched position wherein said cam means fully engage said keeper means, said slidable and pivotal connections permitting said keeper means to move said cam means from said safety position to said unlatched position and said resilient means to return said cam means to said safety position without movement of said manually operable means.

4. Locking mechanism for an automobile convertible top header comprising first cam means rotatably mounted in said header and having latched, unlatched, and safety positions, first resilient means resisting movement of said first cam means to unlatched position and urging said cam means to safety position, second and third cam means rotatably mounted in said header in spaced relationship to said first cam means and having latched, unlatched, and safety positions, second and third resilient means resisting movement of said second and third cam means to unlatched position and urging said cam means to safety position, keeper means contactable by said second and third cam means for moving said cam means from safety position to unlatched position against the action of said second and third resilient means, said second and third resilient means returning said second and third cam means to safety position wherein said second and third cam means partially engage said keeper means, and manually operable means for rotating said first cam means between latched and unlatched positions and for rotating said second and third cam means between latched and safety positions independently of said second and third resilient means.

5. Locking mechanism for an automobile convertible top header comprising first cam means rotatably mounted in said header and having latched, unlatched, and safety positions, first resilient means resisting movement of said first cam means to unlatched position and urging said cam means to safety position, second and third cam means rotatably mounted in said header in spaced relationship to said first cam means and having latched, unlatched, and safety positions, second and third resilient means resisting movement of said second and third cam means to unlatched position and urging said cam means to safety position, keeper means contactable by said second and third cam means for moving said cam means from safety position to unlatched position against the action of said second and third resilient means, said second and third resilient means returning said second and third cam means to safety position wherein said second and third cam means partially engage said keeper means, manually operable means for rotating said first cam means between latched and unlatched positions, and linkage means operatively connecting said manually operable means to said second and third cam means for moving said second and third cam means between safety and latched positions, said linkage means including lost motion connecting means whereby said second and third resilient means is operative to move said second and third cam means between unlatched and safety positions independently of movement of said manually operable means.

6. Locking mechanism for an automobile convertible top header comprising first cam means rotatably mounted in said header and having latched, unlatched, and safety positions, first resilient means resisting movement of said first cam means to unlatched position and urging said cam means to safety position, second and third cam means rotatably mounted in said header in spaced relationship to said first cam means and having latched, unlatched, and safety positions, second and third resilient means resisting movement of said second and third cam means to unlatched position and urging said cam means to safety position, means engageable by said second and third resilient means to limit the action of said resilient means whereby said resilient means is ineffective on said second and third cam means in said latched position, keeper means contactable by said second and third cam means for moving said cam means from safety position to unlatched position against the action of said second and third resilient means, said second and third resilient means returning said second and third cam means to safety position wherein said second and third cam means partially engage said keeper means, manually operable means for rotating said first cam means between latched and unlatched position, and linkage means interconnecting said first cam means and said second and third cam means for rotating said second and third cam means in opposite directions between latched and safety positions, said linkage means including lost motion connecting means with said second and third cam means whereby said second and third resilient means is operable to move said second and third cam means between safety and unlatched positions independently of movement of said linkage means and said first cam means.

References Cited in the file of this patent

UNITED STATES PATENTS

| Re. 20,889 | Smith | Oct. 18, 1938 |
| 1,088,392 | Altmann | Feb. 24, 1914 |
| 2,199,467 | Saunders | May 7, 1940 |
| 2,570,260 | Milhan | Oct. 9, 1951 |
| 2,709,621 | Votypka et al. | May 31, 1955 |

UNITED STATES PATENT OFFICE

CERTIFICATE OF CORRECTION

Patent No. 2,831,718 April 22, 1958

Andrew E. Hallek et al.

It is hereby certified that error appears in the printed specification of the above numbered patent requiring correction and that the said Letters Patent should read as corrected below.

Column 4, line 21, for "gravity" read -- safety --.

Signed and sealed this 12th day of August 1958.

(SEAL)
Attest:
KARL H. AXLINE
Attesting Officer

ROBERT C. WATSON
Commissioner of Patents